United States Patent [19]

Moser

[11] 4,394,130
[45] Jul. 19, 1983

[54] COPPER PHTHALOCYANINES HAVING TRIMETHYLAMMONIUMMETHYL GROUPS AS PAPER DYES

[75] Inventor: Helmut Moser, Reinach, Switzerland

[73] Assignee: Sandoz Ltd., Basel, Switzerland

[21] Appl. No.: 647,432

[22] Filed: Jan. 8, 1976

Related U.S. Application Data

[63] Continuation-in-part of Ser. No. 122,117, Mar. 8, 1971, abandoned, which is a continuation-in-part of Ser. No. 696,152, Jan. 8, 1968, abandoned.

[30] Foreign Application Priority Data

Jan. 18, 1967 [CH] Switzerland .............................. 706/67
Jan. 4, 1968 [CH] Switzerland ............................... 87/68

[51] Int. Cl.³ ............................................. C09B 47/04
[52] U.S. Cl. .......................................... 8/661; 8/527; 8/919
[58] Field of Search .................... 8/1 T, 1 XA, 7, 527, 8/661; 162/162

[56] References Cited

U.S. PATENT DOCUMENTS

| | | | |
|---|---|---|---|
| 2,197,458 | 4/1940 | Wyler | 260/314.5 |
| 2,464,806 | 3/1949 | Haddock et al. | 260/314.5 |
| 3,275,401 | 9/1966 | Fuchs et al. | 8/54.2 |
| 3,320,275 | 5/1967 | Dien et al. | 260/314.5 |
| 3,565,570 | 2/1971 | Dien | 8/7 |

FOREIGN PATENT DOCUMENTS

| | | | |
|---|---|---|---|
| 1447038 | 9/1965 | France . | |
| 449805 | 7/1936 | United Kingdom . | |
| 844338 | 8/1960 | United Kingdom . | |
| 1050886 | 7/1962 | United Kingdom | 260/314.5 |

OTHER PUBLICATIONS

Mukerjee, P. and Ghosh, A. K., *J. Physical Chemistry*, 1963, 67, 193–197.

*Primary Examiner*—A. Lionel Clingman
*Attorney, Agent, or Firm*—Gerald D. Sharkin; Richard E. Vila; Melvyn M. Kassenoff

[57] ABSTRACT

Dyes of the formula

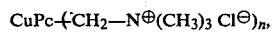

wherein
  CuPc is copper phthalocyanine, and
  n is 2 or 3, and mixtures thereof, are useful as paper dyes. The dyes may be added to paper stock prior to sheet formation or applied to paper in sheet form to produce turquoise colored paper. The dyed or printed paper is bleachable but has good fastness to light, wet treatments, alcohol and soap. The dyes are very soluble in water and exhaust well on, i.e., exhibit good substantivity to, paper.

7 Claims, No Drawings

COPPER PHTHALOCYANINES HAVING TRIMETHYLAMMONIUMMETHYL GROUPS AS PAPER DYES

This application is a continuation-in-part of application Ser. No. 122,117, filed Mar. 8, 1971 and now abandoned, which in turn is a continuation-in-part of application Ser. No. 696,152, filed Jan. 8, 1968 and now abandoned.

This invention relates to the use of a dye of the formula

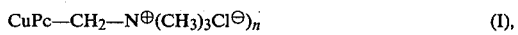

$$CuPc\text{---}CH_2\text{---}N^{\oplus}(CH_3)_3Cl^{\ominus})_n \quad (I),$$

or a mixture thereof, wherein

CuPc is a copper phthalocyanine radical free of sulfo groups or containing up to 0.5 mol of sulfo group per molecule (on the average), and n is 2 or 3, for dyeing and/or printing paper by addition to paper stock prior to sheet formation or by application to paper in sheet form. Preferably, the copper phthalocyanine nucleus is free of sulfo groups (and all other substituents).

This invention thus relates to a process for the dyeing and printing of paper with a dye of Formula I, or a mixture thereof, at a pH of 1 to 14, preferably 4 to 9, and optimally 5.5 to 6.5, and at a temperature of 5°–60° C., preferably 20°–30° C., i.e., at ambient (room) temperature. Thus, the dyes can be applied to paper by the standard methods at room temperature or at a slightly higher temperature at which the quality of the paper is not impaired and from an aqueous acidic, basic or, if preferred, neutral medium. Preferably, the dye(s) of Formula I are incorporated into paper stock under the above conditions prior to sheet formation.

The dyes of Formula I are eminently suitable for dyeing sized and unsized grades of paper by incorporation into paper stock prior to sheet formation or by application to paper in sheet form. They can be employed at both stages of manufacture in powdered form or in solution, preferably in aqueous solution.

A dye of Formula I may be added to paper stock in the form of a concentrated, preferably aqueous, solution, after which the stock can be diluted with water, if necessary, to obtain a dyeing having the desired depth on the subsequently formed paper sheet. Concentrated solutions of the dyes of Formula I containing a carboxylic acid amide such as urea may be used for dyeing paper.

The dyes of Formula I can be converted into, or obtained as, concentrated aqueous solutions containing 25 to 55 parts of 100% dye of Formula I in 100 parts of water. Alternatively, the concentrated aqueous solutions may contain 25 to 120 parts of 100% dye of Formula I and 1 to 45 parts of a carboxylic acid amide in 100 parts of water. The amount of carboxylic acid amide is chosen such that a solution of the dye (or dyes) of Formula I is obtained. Urea is the most suitable carboxylic acid amide.

The dyes of Formula I may also be added to paper stock as they are, e.g., in powdered form, without prior dissolution in water or another solvent.

It was surprising that the dyes of Formula I, whether incorporated into paper stock or applied to paper in sheet form, exhaust quantitatively into or onto paper at room temperature in the absence of any electrolyte or in the presence of only a small amount of electrolyte and yield level dyeings free of specking. The high substantivity to paper of the dyes of Formula I is of great importance in this era of ecology. In view of the high substantivity to paper of the dyes of Formula I, very little or no dye is lost in use and the backwater (white water) from the paper making machine is colorless or virtually colorless. Since the backwater contains little or no dye, it requires less treatment prior to discharge into a body of water such as a stream, river or lake to comply with water pollution control laws and regulations.

With either method of application, i.e., incorporation into paper stock prior to sheet formation and application to paper in sheet form, brilliant turquoise dyeings having very good all-around fastness are obtained.

The light fastness of the obtained dyeings is good and after a long exposure period the dyeings fade tone-in-tone.

The wet fastness of the obtained dyeings is notably good as is the fastness to alcohol. The obtained dyeings are, thus, fast to water, milk, alcoholic drinks, fruit juices and mineral water.

The obtained dyeings also possess good fastness to soap. When tested with a 1% soap solution, the shade of the dyed paper does not change and, furthermore, undyed paper treated together with the dyed paper is not stained.

On the other hand, the obtained dyeings are bleachable by oxidation and reduction methods. Good bleachability is very important for the recovery of broke and the treatment of waste paper; it permits the paper to be recycled, another advantage in this era of ecology.

Furthermore, when the dyes of Formula I are added to paper stock in powdered form (without prior dissolution), there is no reduction in the yield or in the brilliance of the obtained dyeings. The dyes do not mottle to any appreciable extent and they are unaffected by pH conditions.

The dyes of Formula I are known to be useful for dyeing cotton; they are dyed and fixed on cotton at the boiling temperature, i.e., at a temperature in the vicinity of 100° C. British Pat. No. 1,050,886 discloses padding or printing cellulose materials (cotton is the only such material mentioned) with basic phthalocyanine dyes (including copper tris-(trimethylammoniummethyl)phthalocyanine chloride) and then "fixing them on the fibre at an elevated temperature with an aqueous solution of a reducing agent in the presence of an agent having an alkaline reaction" (page 1, lines 17-19). It also states that "it is evident that in the presence of a reducing agent the splitting of the dyestuff takes place more rapidly, and the dyestuff is fixed more intensely on the fibre" (page 1, lines 23-24). Thus, the splitting of the basic dyes on the fiber plays an important role in the invention of British Pat. No. 1,050,886. However, the splitting of the dye alters its chemical constitution and chemical behavior.

In contrast, the dyeing of paper with a dye of Formula I, or a mixture thereof, does not entail treatment at an elevated temperature with an aqueous solution of a reducing agent in the presence of an agent having an alkaline reaction. The dye of Formula I exhausts onto or into paper in its initial, i.e., unchanged, state.

A further difference between the dyeing of paper with a dye of Formula I, or a mixture thereof, and the dyeing of cotton with cationic dyes (including those of British Pat. No. 1,050,886) is that the dyeing of paper, unlike the dyeing of cotton, requires the addition of very little or even no electrolyte.

French Pat. No. 1,447,038 discloses ball-point pen inks containing copper phthalocyanines having 2-4 (alkyl or hydroxyalkyl)ammoniummethyl groups. Copper tris-(trimethylammoniummethyl)phthalocyanine chloride is specifically mentioned. The disclosed ball-point pen inks contain benzyl alcohol and/or one or more gylcols and a synthetic resin soluble in benzyl alcohol or the glycol(s) used; they do not contain water.

British Pat. No. 449,805 describes the use of copper phthalocyanine pigments for paper dyeing. The pigments of the patent are not comparable to the cationic dyes of Formula I and, furthermore, yield unlevel dyeings on paper.

German Pat. No. 812,945 discloses the dye of the formula

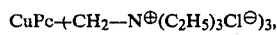

$$CuPc+CH_2-N^{\oplus}(C_2H_5)_3Cl^{\ominus})_3,$$

wherein CuPc is copper phthalocyanine. It indicates that this dye is not easily soluble in water. In contrast, the dyes of Formula I are well-soluble, even in cold water.

U.S. Pat. No. 3,320,275 and French Pat. No. 1,377,708 disclose the use of copper phthalocyanines having substituted hydrazinium groups for dyeing cellulosic materials such as cotton, paper and the like. Among the dyes disclosed is

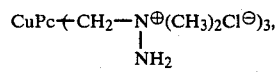

$$CuPc+CH_2-N^{\oplus}(CH_3)_2Cl^{\ominus})_3,$$
$$\phantom{CuPc+CH_2-}|$$
$$\phantom{CuPc+CH_2-}NH_2$$

wherein CuPc is copper phthalocyanine. The dyeings on paper are disclosed to have excellent light and wash fastness. Surprisingly, the dyes of Formula I are more soluble in water, particularly at room temperature. The superior solubility of the dyes of Formula I enables one to utilize concentrated aqueous solutions (stock solutions) thereof for the continuous dyeing of paper. The use of solutions eliminates the need to weight out the dyes in powdered form during which troublesome dusting often occurs.

The dyes of Formula I may be produced, for example, in accordance with U.S. Pat. No. 2,435,307 or German Pat. No. 843,726 by chloromethylation of copper phthalocyanine and reaction of the chloromethylated product(s) with trimethylamine. See also British Patent 689,153.

In the examples, the parts are by weight.

EXAMPLE 1

70 Parts of chemically bleached sulfite pulp are mixed with 30 parts of chemically bleached birch pulp and 0.2 parts of the dye copper bis-(trimethylammoniummethyl)phthalocyanine chloride in aqueous solution. After 10 minutes, the stock, which has a pH of 6.5, is formed into an absorbent sheet of paper having a turquiose shade of medium depth. Although the paper contains no sizing or fixing agent, the dye is so well fixed that the white water from the paper making machine is colorless. The dyeing is wet-fast.

EXAMPLE 2

100 Parts of chemically bleached sulfite pulp are beaten in a beater, during which 2 parts of rosin milk are added. Shortly afterwards, 0.5 parts of an aqueous solution of a mixture of the dyes copper bis- and tris-(trimethylammoniummethyl)phthalocyanine chloride are added after which the stock has a pH of 8. After 10 minutes, 3 parts of aluminum sulfate are added to adjust the pH to 4.6 and, after an additional 10 minutes, paper sheet is formed. The obtained paper has a bright turquoise shade of medium depth and is fast to light and wet treatments.

EXAMPLE 3

95 Parts of copper tris-(chloromethyl)phthalocyanine are added in small portions over 3 hours to a mixture of 230 parts of water and 76 parts of a 32% aqueous trimethylamine solution at 40°. Stirring is continued for 5 hours to obtain a dye solution of thin consistency having a dye content of approximately 30%. The same procedure can be followed using 165 parts of water to obtain a concentrated aqueous solution containing about 35% of 100% dye. The obtained solutions can be adjusted to any desired concentration by the addition of water, although concentrated solutions containing 25-55 parts of 100% dye in 100 parts of water are best.

EXAMPLE 4

95 Parts of copper tris-(chloromethyl)phthalocyanine are added in small portions over 3 hours to a mixture of 95 parts of water and 76 parts of a 32% aqueous trimethylamine solution at 40° C. After stirring for 5 hours, a highly viscous solution is obtained. Upon addition of 10% urea (calculated on the total amount of the solution), it is converted into a dye solution of low viscosity with a dye content of approximately 40%.

EXAMPLE 5

100 Parts of stock consisting of 70 parts of bleached softwood pulp and 30 parts of bleached hardwood pulp having a 2.5% consistency is adjusted to a pH of 9 with a sodium hydroxide solution. The stock is beaten to a freeness value of 20° Schopper-Riegler and then 0.3 parts of the dye of Example 1 are added. After continued circulation for 2 minutes, the stock is converted at a 0.5% consistency and a pH of 9 into paper sheet. The sheet is absorbent, is dyed in a turquoise shade and has very good water and alcohol fastness. The white water from the wire of the paper making machine is colorless.

EXAMPLE 6

A continuous sheet of absorbent, unsized paper is conducted through a solution consisting of 0.5 parts of the dye of Example 1, 0.5 parts of starch and 99 parts of water and the excess solution is expressed with a pair of rollers. (Preferably, the temperature of the solution is raised to 40°-50° C. in order to obtain better penetration of the sheet.) The wet sheet is dried and creped on a drying cylinder to give a colored decorative paper.

EXAMPLES 7-9

The processes of Examples, 1, 2 and 5 are repeated using as the dye, a 25% solution of copper tris-(trimethylammoniummethyl)phthalocyanine prepared by diluting a 30% solution obtained according to the process of Example 3 using copper tris-(chloromethyl)phthalocyanine synthesized according to the process of British Pat. No. 689,153.

What is claimed is:

1. A process for producing turquoise paper comprising (a) incorporating into paper stock an effective amount of a dye of the formula $$CuPc-CH_2-N(CH_3)_3Cl^{\ominus})_n,$$

or a mixture thereof, wherein
 CuPc is a copper phthalocyanine radical having not more than 0.5 mol of sulfo group per molecule, and
 n is 2 or 3,
said effective amount being an amount sufficient to impart the desired turquoise color to the paper to be formed, and (b) forming turquoise paper from said paper stock.

2. A process according to claim 1 wherein CuPc is copper phthalocyanine.

3. A process according to claim 2 wherein n is 3.

4. A process according to claim 2 wherein n is 2.

5. A process according to claim 2 wherein a mixture dyes wherein n is 2 or 3 is used.

6. A process according to claim 2 comprising (a) admixing an effective amount of a dye of the formula $$CuPc-CH_2-N(CH_3)_3Cl^{\ominus})_n,$$

or a mixture thereof, wherein
 CuPc is a copper phthalocyanine, and
 n is 2 or 3,
with cellulose in an aqueous medium to form paper stock, said effective amount being an amount sufficient to impart the desired turquoise color to the paper to be formed, and (b) forming turquoise paper from said paper stock.

7. A process according to claim 6 wherein said cellulose is chemically bleached sulfite cellulose.

* * * * *